(12) United States Patent
Choi

(10) Patent No.: US 7,826,134 B2
(45) Date of Patent: Nov. 2, 2010

(54) HIGH-DEFINITION SOUND-ABSORBING SCREEN

(76) Inventor: Hae-Yong Choi, Mookdong I Park Apartment #108-301, 385 Mook-dong, Jungryang-gu, Seoul-city (KR) 131-768

( * ) Notice: Subject to any disclaimer, the term of this patent is extended or adjusted under 35 U.S.C. 154(b) by 306 days.

(21) Appl. No.: 11/798,356

(22) Filed: May 14, 2007

(65) Prior Publication Data

US 2008/0007652 A1    Jan. 10, 2008

(30) Foreign Application Priority Data

Jul. 6, 2006   (KR) .................... 10-2006-0064340
Jan. 23, 2007  (KR) .................... 10-2007-0006921

(51) Int. Cl.
*G03B 21/56* (2006.01)
(52) U.S. Cl. .................................. 359/445
(58) Field of Classification Search ............ 359/445, 359/450, 443
See application file for complete search history.

(56) References Cited

U.S. PATENT DOCUMENTS

| | | | | |
|---|---|---|---|---|
| 2,862,552 A | * | 12/1958 | Franz | 160/368.1 |
| 3,523,717 A | * | 8/1970 | Glenn, Jr. | 359/449 |
| 4,143,943 A | * | 3/1979 | Rawson | 359/446 |
| 4,406,519 A | * | 9/1983 | Shaw | 359/443 |
| 5,159,362 A | * | 10/1992 | Monroe et al. | 352/85 |
| 5,361,163 A | * | 11/1994 | Matsuda et al. | 359/452 |
| 7,510,111 B2 | * | 3/2009 | Mikkelsen et al. | 235/375 |
| 2003/0137728 A1 | * | 7/2003 | Kuroda et al. | 359/455 |
| 2004/0240054 A1 | * | 12/2004 | Aiura et al. | 359/455 |

FOREIGN PATENT DOCUMENTS

JP          06250289 A  *  9/1994

* cited by examiner

*Primary Examiner*—Christopher E Mahoney
*Assistant Examiner*—Leon W. Rhodes
(74) *Attorney, Agent, or Firm*—Bacon & Thomas, PLLC

(57) ABSTRACT

Disclosed herein is a projection screen. The screen includes a soft thin elastic transmission sheet having an elongation rate of 50% or more and high transmissivity, the elastic transmission sheet constituting a front surface of the screen, and a thin image sheet for focusing an image projected from a projector, the image sheet constituting a rear surface of the screen. The image sheet may serve as a transmission sheet or a reflection sheet. The image sheet may be directly formed at the screen, or the image sheet may be a hard film attached to the rear of the elastic transmission sheet. A vibration plate is disposed at the outside of the image sheet. Consequently, incident image is transmitted or reflected without any interference with external light, and therefore, it is possible to increase the brightness of the screen by two to five times as compared to a conventional screen. Also, external acoustic sound is dispersed and focused on the elastic transmission sheet of the screen, and the acoustic sound is extinguished by the vibrate plate. Consequently, the screen according to the present invention has a sound absorbing function and a high-brightness image display function.

10 Claims, 9 Drawing Sheets

HIGH-DEFINITION SOUND-ABSORBING SCREEN

BACKGROUND OF THE INVENTION

1. Field of the Invention

The present invention relates to a projection screen, and, more particularly, to a high-definition sound-absorbing screen that is capable of performing a function of absorbing acoustic sound, a function of highly reflecting an image incident on the screen, and a function of transmitting an image incident on the screen with high definition.

2. Description of the Related Art

Generally, a screen image is used in churches or concert halls as a background image.

Recently, there has been an increase in installing a screen at the rear of a stage for praise worships, singers' recitals, orchestra concerts, and speeches so as to provide a background image.

An image and acoustic sound have the same physical characteristics, such as reflection and diffusion.

Consequently, the use of a screen having high reflexibility is required to provide a bright image. However, the screen having such high reflexibility also reflects a large amount of acoustic sound with the result that a noise phenomenon due to the reflection of the acoustic sound may occur.

The reflection of the acoustic sound is prevented by using a screen having low reflexibility. In this case, however, the brightness of an image is reduced, and therefore, the image may become unclear.

In other words, the reflection of the acoustic sound is proportional to the brightness of the image.

SUMMARY OF THE INVENTION

Acoustic sound is an air energy, and light of a projection image is a wave motion.

Therefore, it is an object of the present invention to provide a method of absorbing acoustic sound and transmitting and reflecting a projection image at a single screen, using the difference between the acoustic sound and the projection image, thereby obtaining a high-definition image.

It is another object of the present invention to provide a method of increasing absorptivity of acoustic sound while maintaining the flatness of a screen, which is a fundamental function of the screen, vibrating the screen through a vibration plate according to the acoustic sound so as to further increase the absorptivity, whereby the screen simultaneously has an effective sound-absorbing function and a high-definition image display function.

In accordance with the present invention, the above and other objects can be accomplished by the provision of a high-definition sound-absorbing screen including a soft thin elastic transmission sheet having elasticity and transmissivity, the elastic transmission sheet constituting a front surface of the screen, and a thin image sheet for focusing an image projected from a projector, the image sheet constituting a rear surface of the screen, whereby a sound absorbing function and a high-definition image focusing function are simultaneously accomplished by a single thin structure of the screen.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
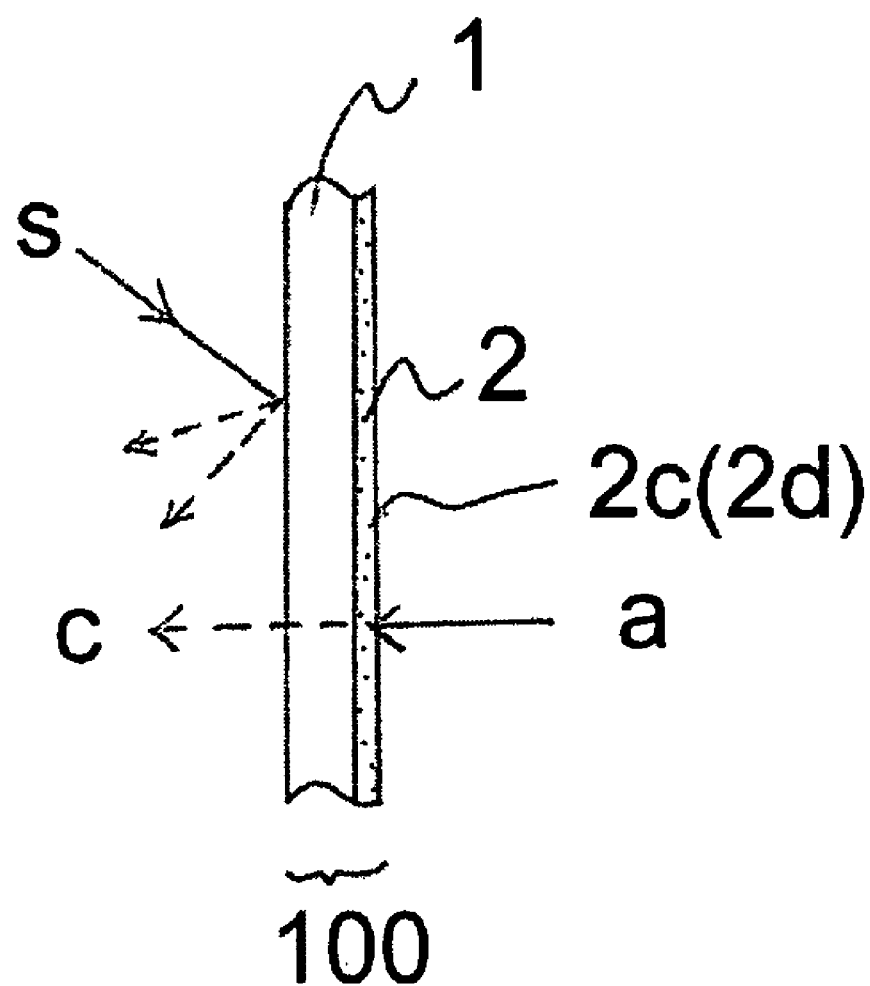
FIG. 1 is a side sectional view, in part, illustrating a principle of sound absorption and image transmission of a high-definition sound-absorbing screen according to the present invention.

FIG. 1 is a side sectional view, in part, illustrating a transmission type screen 100 according to the present invention.

As shown in FIG. 1, the screen 100 includes an elastic transmission sheet 1 as the front surface of the screen 100. The elastic transmission sheet 1 is made of a soft elastic material that is capable of transmitting an image.

It is required that the front surface of the screen 100 has an elongation rate of 50% or more to provide elasticity to the front surface of the screen 100. In this case, the front surface of the screen 100 has elasticity like rubber. Also, the material for the front surface of the screen 100 must be transparent and have high transmissivity in order that the screen 100 has a high-definition transmitting and reflecting function.

As the material satisfying the above-mentioned conditions, there may be used a transparent rubber, silicone rubber, or urethane.

The specified material has an elongation rate of 50% to 600%. Also, the material is soft, and the hardness of the surface of the material is low. Furthermore, the material is transparent. Consequently, it is possible to transmit and reflect a focused projection image.

The screen 100 further includes an image sheet 2 for focusing the projection image as the rear surface of the screen 100. An incident image a projected from the rear of the screen 100 is focused on the image sheet 2, and is displayed on the front surface of the screen as a transmission image c such that a user can watch the transmission image c on the front surface of the screen 100.

When the transmissivity of the material for the image sheet 2 is high, however, it is possible to control the transmissivity of the screen 100 by adding an appropriate amount of diffusion material to the elastic transmission sheet 1. In addition, a dark-colored dye or pigment may be added to increase the contrast of the screen 100 and thus the definition of the screen 100.

As shown in FIG. 1, a considerable amount of acoustic sound S generated at the outside of the screen 100 and incident on the screen 100 is extinguished due to the elasticity of the front surface of the screen 100, i.e., the elastic transmission sheet 1.

At the same time, the transmission image c focused on the image sheet 2 is transmitted to the front surface of the screen 100 without any interference with external light. As a result, the transmission image c projected from the rear of the screen 100 and transmitted to the front surface of the screen 100 may have a brightness of 2 to 5 gains. Consequently, it is possible to increase the brightness of the screen 100 by two to five times as compared to a conventional transmission type screen having a brightness of 1 gain while accomplishing a sound absorbing effect.

As shown in FIG. 1, the image sheet 2 may be made of thin transmission film 2d, which is attached to the rear of the elastic transmission sheet 1. Alternatively, the image sheet 2 may be formed by directly applying a diffusion material to the rear surface of the screen 100 or embossing the rear surface of the screen 100.

Figure 2:
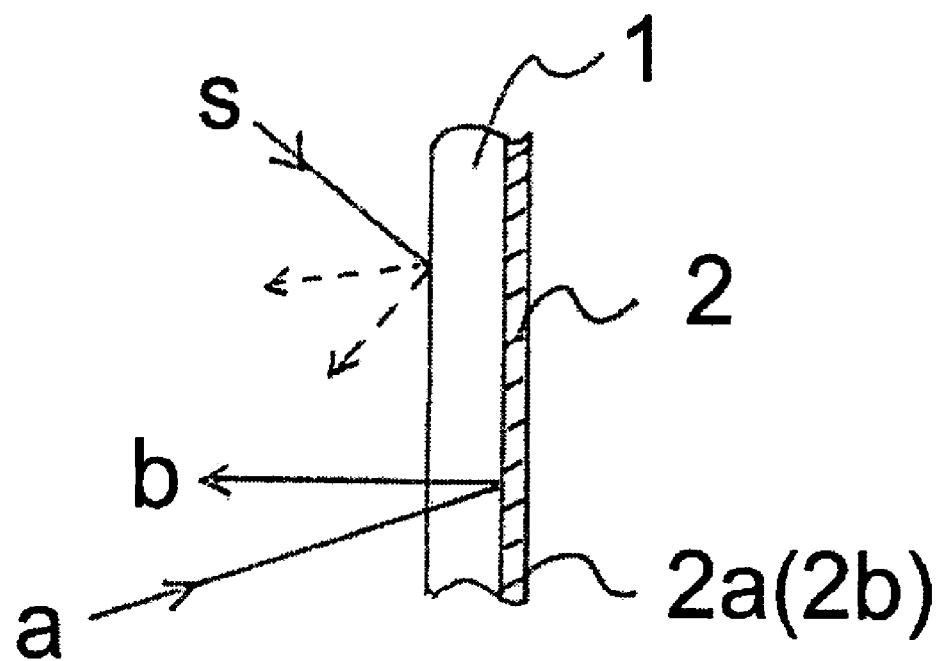
FIG. 2 is a side sectional view, in part, illustrating a principle of sound absorption and image reflection of a high-definition sound-absorbing screen according to the present invention.

FIG. 2 is a side sectional view, in part, illustrating a reflection type screen according to the present invention.

As shown in FIG. 2, the reflection type screen includes a reflection sheet 2a formed by depositing a reflection material such as aluminum at the rear surface of the elastic transmission sheet 1.

In this case, an image incident on the screen is transmitted through the elastic transmission sheet 1, is reflected by the reflection sheet 2a, and is then transmitted through the elastic transmission sheet 1, whereby a user can watch the transmission image on the front surface of the screen 100.

The reflection sheet 2a may be formed by attaching a thin reflection film 2b having a reflection surface deposited thereon to the rear surface of the screen 100. Alternatively, the reflection sheet 2a may be formed by directly depositing aluminum on the rear surface of the screen 100.

According to this embodiment, a considerable amount of acoustic sound S is extinguished due to the elasticity of the front surface of the screen 100, i.e., the elastic transmission sheet 1. Also, the brightness of the reflection image b depends on the reflexibility of the reflection sheet 2a. Generally, a general flat screen may have a brightness of 5 gains to the maximum. Consequently, it is possible to accomplish a sound absorbing effect while increasing the brightness of the screen 100 by five times to the maximum as compared to a conventional transmission type screen having a brightness of 1 gain.

The transmission film 2d of FIG. 1 and the reflection film 2b of FIG. 2 are thin hard films having no elongation rate. Although the thickness of the transmission film 2d and the reflection film 2b is not particularly restricted, the transmission film 2d and the reflection film 2b generally have a thickness of 2 um to 1000 um such that the transmission film 2d and the reflection film 2b can be rolled.

The transmission film 2d may contain an appropriate amount of diffusion material to adjust the transmission amount of the image.

In the reflection screen structure shown in FIG. 2, the image sheet 2 disposed at the rear of the screen 100 is made of a thin hard film having no elongation rate like the reflection film 2b. Also, the image sheet 2 has a thickness of 2 um to 1000 um such that the image sheet 2 can be rolled.

In this way, the elastic transmission sheet 1 of FIGS. 1 and 2 is made of a soft material having high elongation rate, i.e., an elongation rate of 50% or more, whereas the transmission film 2d and the reflection film 2b disposed at the rear of the elastic transmission sheet 1 are made of a hard material having no elongation rate. Consequently, the screen 100 according to the present invention is constructed in a heterogeneous structure.

In the heterogeneous structure, the acoustic sound is effectively absorbed by the soft elastic transmission sheet 1, and the flatness of the screen 100 is maintained by the hard reflection film 2b and the hard transmission film 2d.

Figure 3:
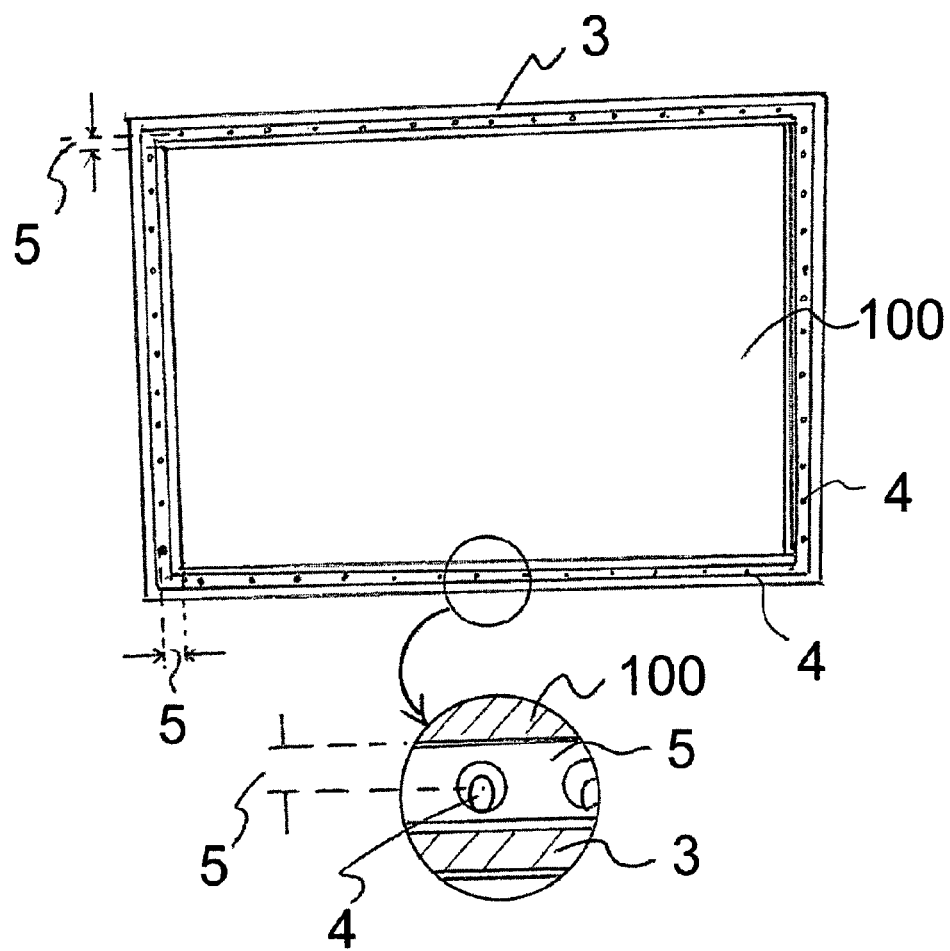
FIG. 3 is a front view illustrating a high-definition sound-absorbing screen according to the present invention mounted to a frame.
Figure 4A:
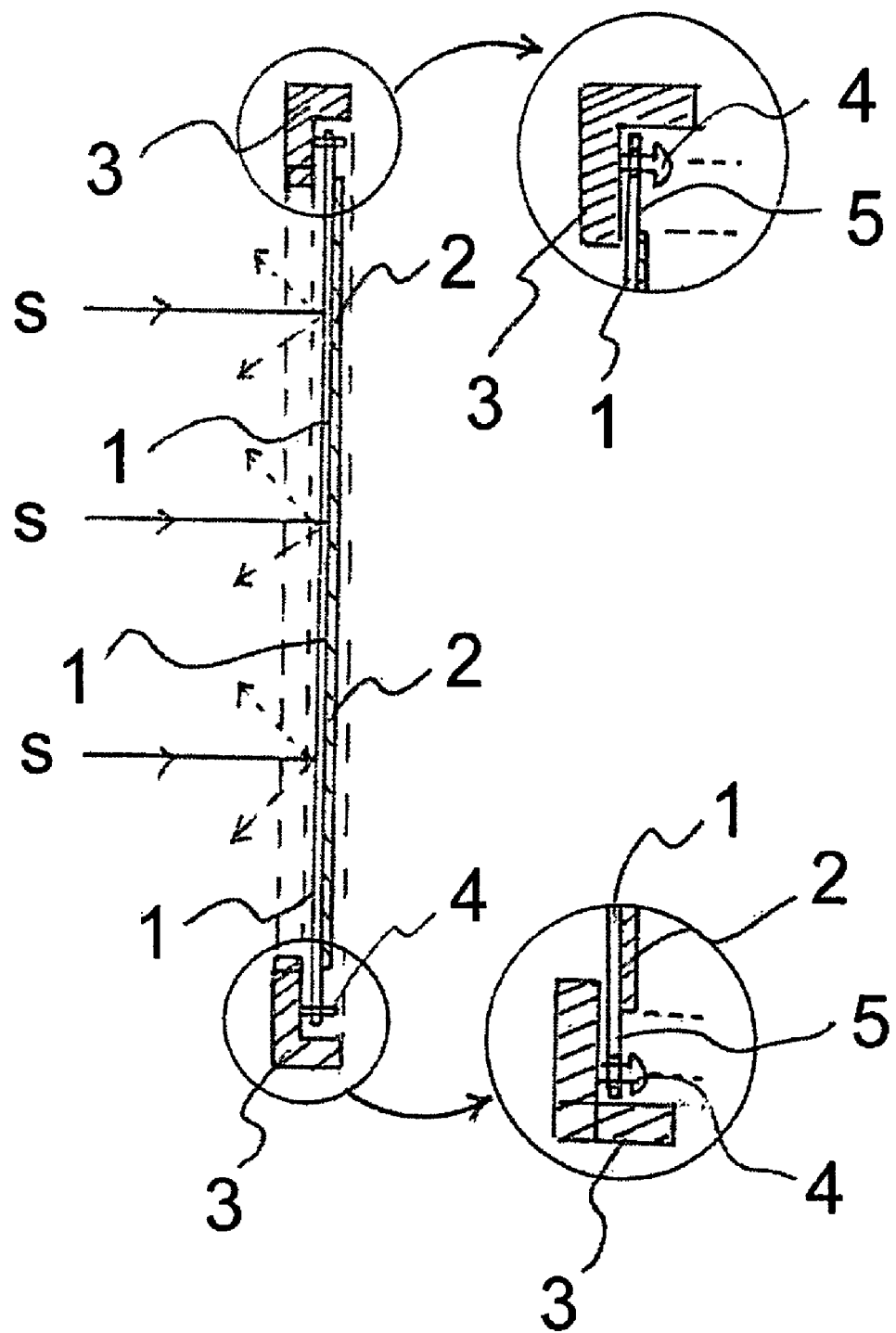
FIG. 4A is a side sectional view illustrating vibration of the high-definition sound-absorbing screen mounted to the frame shown in FIG. 3.

The screen 100 shown in FIGS. 1 and 2 may be mounted to a rigid frame 3, which is made of, for example, metal or wood, as shown in FIGS. 3 and 4A, such that the screen 100 can be used as a flat type screen.

As shown in FIGS. 3 and 4A, fixing pins are provided at the inside of the frame 3 along four sides of the frame at predetermined intervals. Also, the elastic transmission sheet 1 is extended outward such that the horizontal and vertical lengths of the elastic transmission sheet 1 are increased, and therefore, the elastic transmission sheet 1 sufficiently covers four sides of the image sheet 2. The extension of the elastic transmission sheet 1 forms a vibration plate 5. The vibration plate 5 is fixed to the frame 3.

Figure 4B:
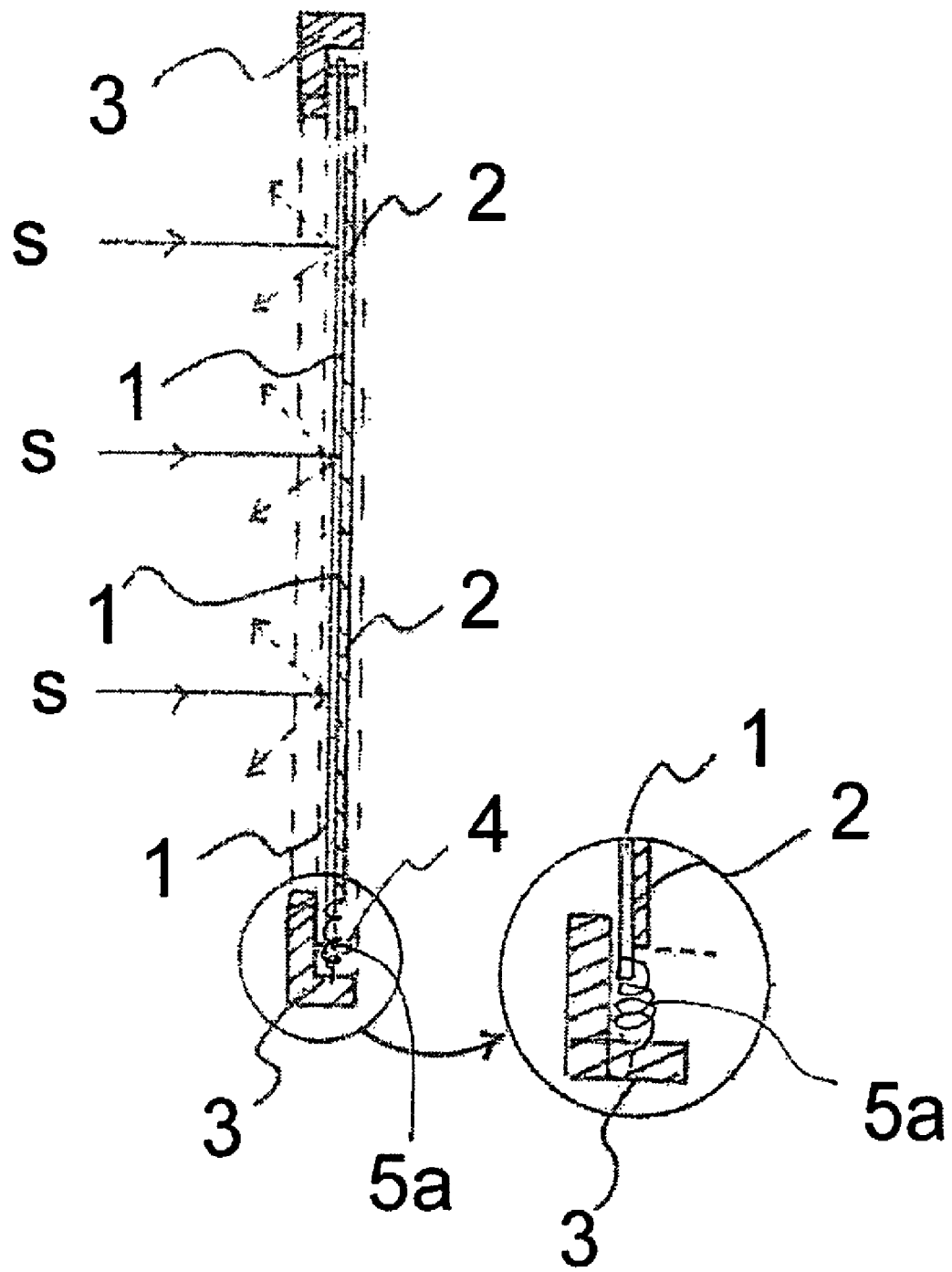
FIG. 4B is a view illustrating a modification of the high-definition sound-absorbing screen of FIG. 3, which is mounted to the frame by means of springs.

Alternatively, small-sized springs 5a may be arranged at predetermined intervals between the screen 100 and the frame 3, specifically between the vibration plate 5 and the frame 3, as shown in FIG. 4B.

When acoustic sound S is incident on the screen 100, the vibration plate 5 and the screen 100 are vibrated about the frame 3 by the elasticity of the springs 5a, and therefore, the acoustic sound S is absorbed.

As described above, the elastic transmission sheet 1 has an elongation rate of 50% or more. As a result, the vibration plate 5 also has the same elongation rate as the elastic transmission sheet 1. Consequently, when the vibration plate 5 is fixed to the frame 3, the screen 100 is stretched tightly in all directions.

Especially, the vibration plate 5 fixed to the frame 3 is vibrated along with the elastic transmission sheet 1 by the external acoustic sound S incident on the screen, whereby the acoustic sound S is extinguished.

Specifically, the elastic transmission sheet 1 extinguishes the acoustic sound S by virtue of the softness of the elastic transmission sheet 1, and, in addition, the vibration plate 5 is simultaneously vibrated by the acoustic sound S incident on the screen, whereby the acoustic sound S is extinguished.

This effect may be equally accomplished either in the transmission image structure of FIG. 1 or in the reflection image structure of FIG. 2.

Figure 5:
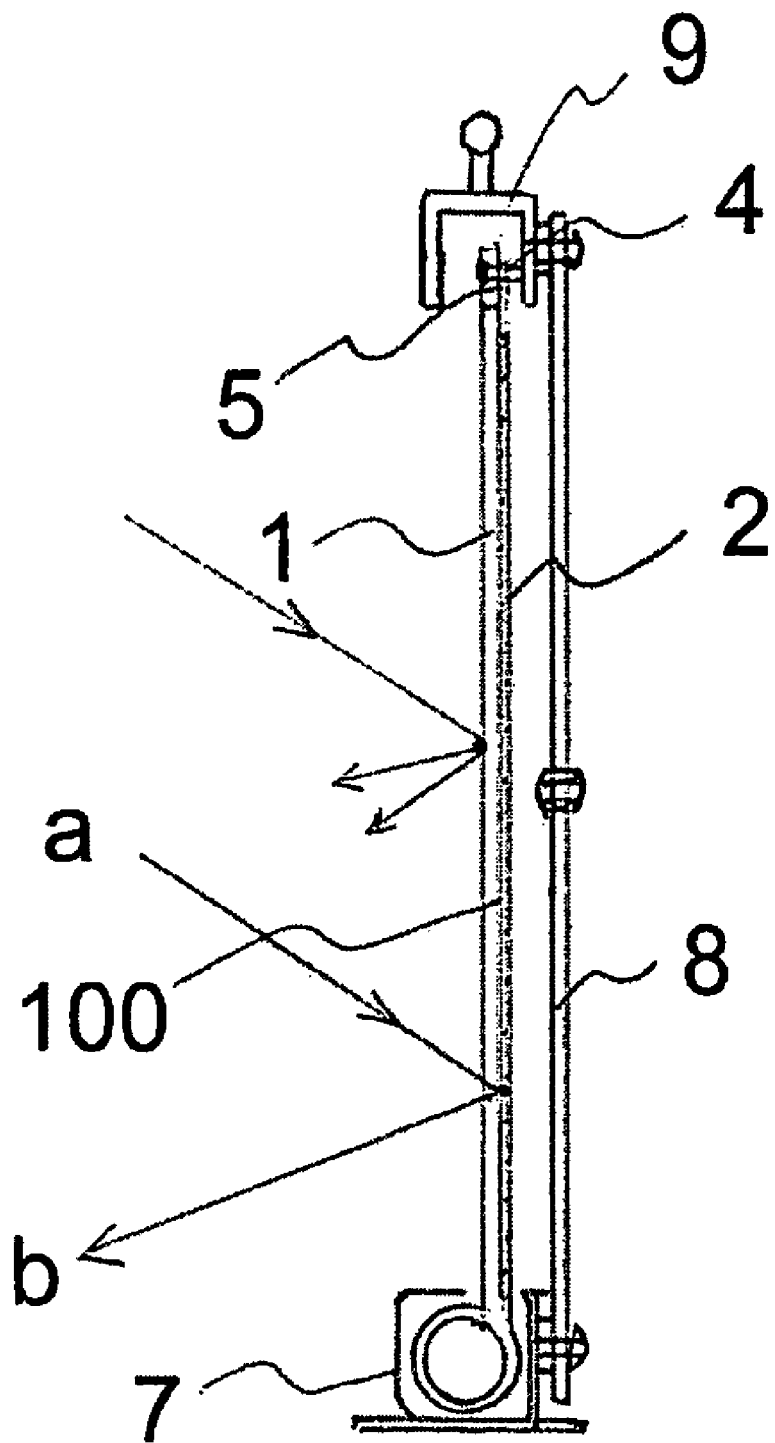
FIG. 5 is a side sectional view illustrating a sound-absorbing roll screen according to a preferred embodiment of the present invention.

FIG. 5 illustrates a movable type screen structure. Specifically, a rotary rod 6 is disposed in a lower end member 7 while the screen 100 of FIGS. 1 and 2 are rolled on the rotary rod 6. The screen 100 is unrolled from the rotary rod 6, is moved upward, and is then supported by a supporting member 8 when in use. The screen 100 is moved downward, and is rolled onto the rotary rod 6 when in safekeeping. In this way, the screen 100 is vertically opened and closed.

In the movable type screen structure shown in FIG. 5, rear fixing pins. 4 formed at an upper end member 9 of the movable type screen structure are connected to the vibration plate 5 of the screen 100. Consequently, the screen 100 is vibrated by the acoustic sound S incident on the screen 100.

Figure 6:
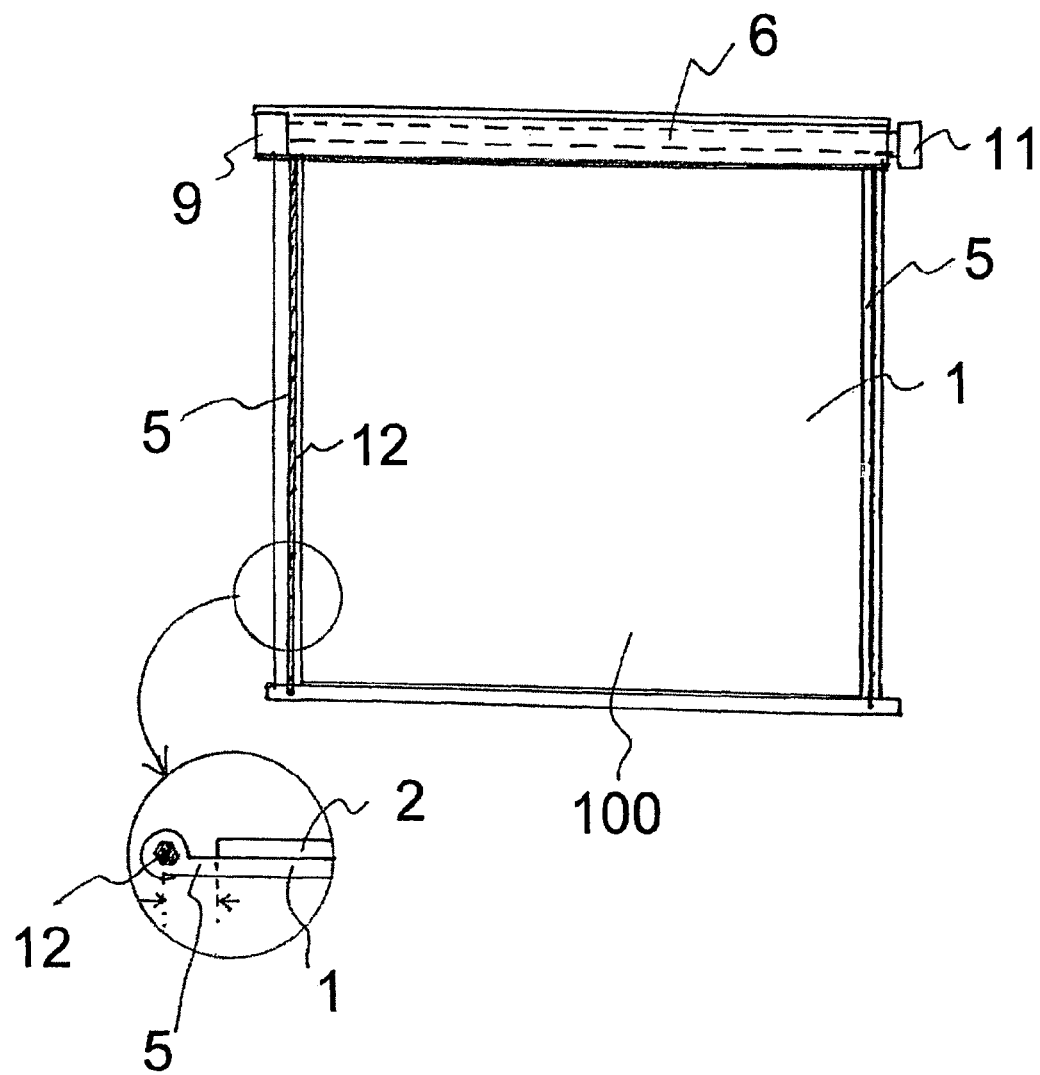
FIG. 6 is a front view illustrating an assembly of wire and vibration plate applied to the sound-absorbing roll screen according to the present invention.

FIG. 6 illustrates a roll screen structure. Specifically, a rotary rod 6 is disposed in an upper end member 9 of the roll screen structure, and the rotary rod is connected to a motor 11.

FIG. 6 also illustrates a partially enlarged sectional view of a wire 12 mounted in the vibration plate 5.

As shown in FIG. 6, the wire 12 is mounted in the vibration plate 5, and therefore, the screen 100 is vibrated by the acoustic sound incident on the screen 100 along with the vibration plate 5 about the wire 12, whereby the acoustic sound is extinguished.

The wire 12 and the vibration plate 5 are vertically moved in the same manner according to the vertical opening and closing of the screen such that the wire 12 and the vibration plate 5 are opened and closed in the form of a roll.

Figure 7:
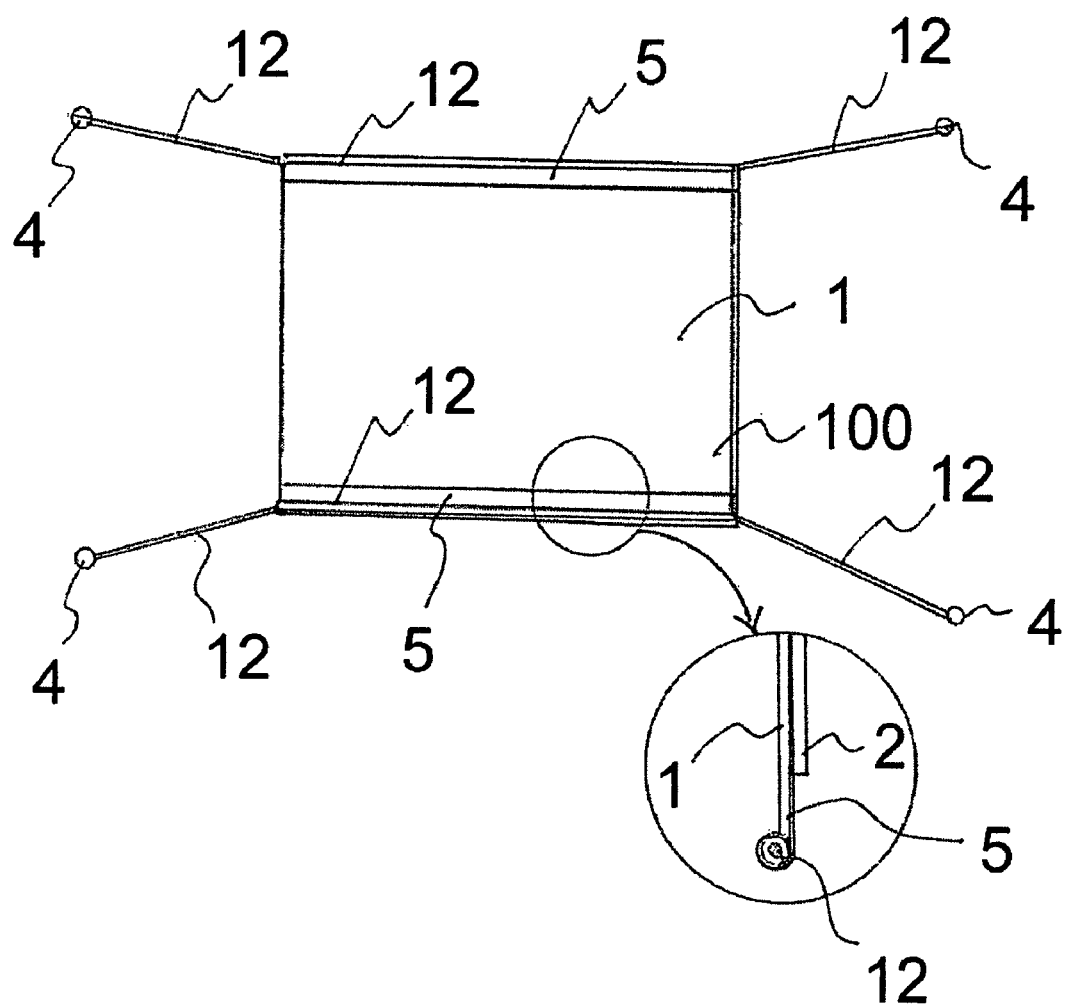
FIG. 7 is a front view illustrating the use of another assembly of wire and vibration plate.

FIG. 7 is a front view illustrating a structure in which the elastic transmission sheet 1 is extended to form the vibration plate 5 and the wire 12 is mounted in the vibration plate 5 as in FIG. 6, and, in addition, the wire 12 is extended to the outside.

According to the structure shown in FIG. 7, the wire 12 is pulled outward to flatten the screen 100. As a result, the screen 100 is vibrated about the wire 12 by the acoustic sound S incident on the screen 100 according to the elongation rate of the vibration plate 5, whereby the acoustic sound is absorbed and extinguished.

Figure 8:
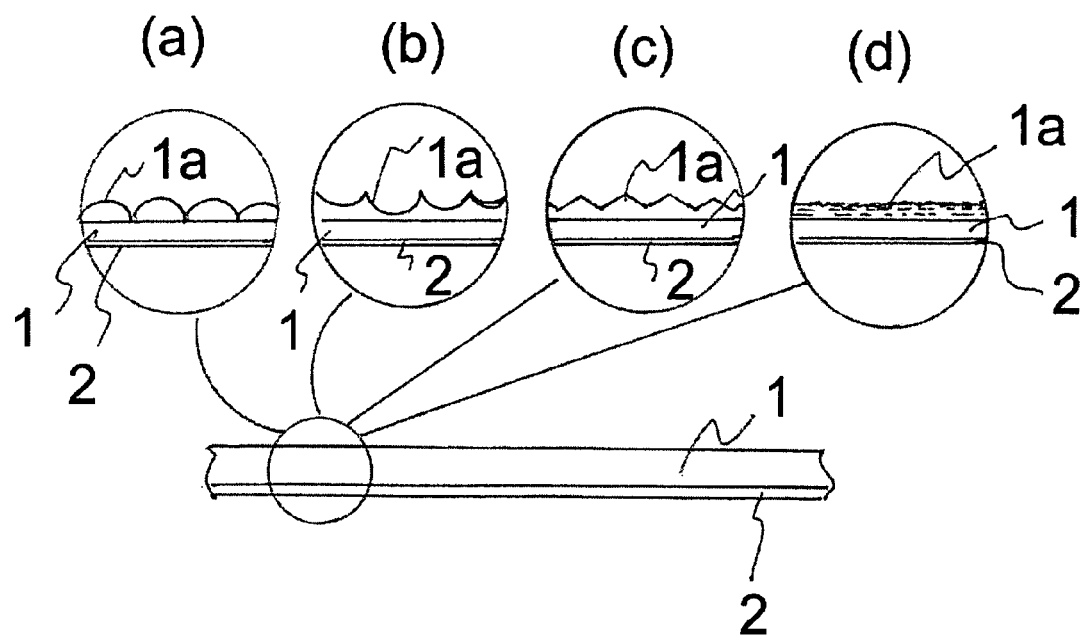
FIG. 8 is a side sectional view, in part, illustrating various surfaces of the elastic transmission sheet applicable to the high-definition sound-absorbing screen according to the present invention.

FIG. 8 is a side sectional view, in part, illustrating various surfaces of the elastic transmission sheet applicable to the high-definition sound-absorbing screen according to the present invention.

As shown in FIG. 8, the surface of the elastic transmission sheet 1 may be embossed in various shapes. For example, the surface of the elastic transmission sheet 1 may be formed in a minute convex shape (see circle A of FIG. 8), a minute concave shape (see circle A of FIG. 8), a minute sawtooth shape (see circle C of FIG. 8), or an irregular surface shape (see circle D of FIG. 8).

When the surface of the elastic transmission sheet 1 is embossed as described above, the surface area of the elastic transmission sheet 1 is increased as compared to the flat surface of the elastic transmission sheet 1. Consequently, the contact between the elastic transmission sheet 1 and the acoustic sound S is increased, and therefore, the sound absorbing effect is increased.

On the other hand, the transmission film 2d of FIG. 1 and the reflection film 2b of FIG. 2 may be removed, and the elastic transmission sheet 1 may have a transmission surface 2c or a reflection surface 2a serving as the image sheet 2.

Consequently, the elastic transmission sheet 1 of the screen 100 performs a function as the image sheet 2 and a function as the vibration plate 5 as well as a function as the elastic transmission sheet 1.

In this case, the elongation rate of the elastic transmission sheet 1 is increased to 200% or more, and the elastic transmission sheet 1 is pulled in all directions by the structure of the vibration plate 5, whereby the screen 100 responds the acoustic sound more sensitively while the flatness of the screen 100 is maintained.

The connection between the vibration plate 5 and the frame 3 is not particularly restricted. Furthermore, the fixing pins 4 may be formed in various shapes so as to more easily accomplish the assembly of the screen.

As apparent from the above description, the elastic transmission sheet, which has high elasticity and is made of a material having high transmissivity, constitutes the front surface of the screen, and the image sheet having the transmission or reflection function constitutes the rear surface of the screen. In this case, the thin film, which can be rolled, is attached to the rear of the elastic transmission sheet, or the rear surface of the elastic transmission sheet serves as the image sheet. Consequently, external acoustic sound is absorbed into the front surface of the elastic transmission sheet, and transmission or reflection image is dispersed and focused on the rear surface of the elastic transmission sheet such that the image can be display with a brightness increased by two to five times, whereby the screen according to the present invention has a sound absorbing function and a high-brightness image display function.

Also, the elastic transmission sheet is made of a soft material having an elongation rate of 50% or more and 600% to the maximum, and the reflection film or the transmission film attached to the rear of the elastic transmission sheet is made of a hard material having no elongation rate. Consequently, the sound absorbing function is carried out by the soft front surface of the screen, and the image focusing function and the screen flatness maintaining function are carried out by the hard rear surface of the screen.

When the screen is mounted to a frame or a conventional roll screen structure, the vibration plate is further provided, and therefore, the sound absorbing effect is further increased.

Furthermore, the rear surface of the elastic transmission sheet serves as the image sheet having a reflection function or a transmission function. Consequently, the acoustic sound is simultaneously absorbed by the front elastic surface of the screen and the vibration plate 5, and the high-definition image is focused and reflected or transmitted at the rear surface of the screen.

Consequently, the present invention has the effect of simultaneously performing a high-definition image display function with a brightness increased by two to five times as compared to a conventional screen and a sound absorbing function for absorbing and extinguishing acoustic sound using only a single screen structure. Therefore, the present invention is very useful as a background screen for concerts, lecture halls, stages, speech meeting halls.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-definition sound-absorbing screen comprising:
   a soft thin elastic transmission sheet made of a material having an elongation rate of 50% or more and having both elasticity and transmissivity, the elastic transmission sheet constituting a flat front surface of the screen; and
   a thin hard film image sheet having no elongation rate, and having a dispersion function, for focusing an image projected from a projector, the image sheet constituting a rear surface of the screen,
   wherein a sound absorbing function, provided by the elastic transmission sheet, and a high-definition image focusing function, provided by the image sheet, are simultaneously accomplished by a single thin structure of the screen.

2. The screen according to claim 1, wherein the image sheet, having the dispersion function, includes a thin reflection film so as to form a reflection screen.

3. The screen according to claim 1, wherein the image sheet includes a thin transmission film so as to form a transmission screen.

4. The screen according to claim 1, wherein the screen is mounted to a frame.

5. The screen according to claim 4, further comprising:
   springs arranged between the frame and a vibration plate formed by an extension of the elastic transmission sheet.

6. The screen according to claim 1, wherein the screen is constructed in a structure in which the screen can be rolled and unrolled.

7. The screen according to claim 1, further comprising:
a vibration plate formed by an extension of the elastic transmission sheet disposed at the outside of the image sheet such that the image sheet can be vibrated by acoustic sound.

8. The screen according to claim 7, wherein the vibration plate has a wire mounted therein.

9. A high-definition sound-absorbing screen comprising:
a soft thin elastic transmission sheet made of a material having an elongation rate of 50% or more and having both elasticity and transmissivity, the elastic transmission sheet constituting a front surface of the screen and having an embossed surface; and a thin hard film image sheet having no elongation rate, and having a dispersion function, for focusing an image projected from a projector, the image sheet constituting a rear surface of the screen, wherein a sound absorbing function, provided by the elastic transmission sheet, and a high-definition image focusing function, provided by the image sheet, are simultaneously accomplished by a single thin structure of the screen.

10. The screen according to claim 9, wherein the embossed front surface has the form of minute convex shapes, minute concave shapes, minute sawtooth shapes, or an irregular surface shape.

* * * * *